(12) United States Patent
Yeh

(10) Patent No.: US 11,687,444 B2
(45) Date of Patent: Jun. 27, 2023

(54) DATA MANAGING METHOD. MEMORY CONTROLLING CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 53 days.

(21) Appl. No.: 16/600,568

(22) Filed: Oct. 14, 2019

(65) Prior Publication Data

US 2021/0073117 A1    Mar. 11, 2021

(30) Foreign Application Priority Data

Sep. 6, 2019  (TW) .................................. 108132227

(51) Int. Cl.
*G06F 3/06*       (2006.01)
*G06F 12/02*      (2006.01)
*G06F 12/0882*    (2016.01)

(52) U.S. Cl.
CPC ........ *G06F 12/0246* (2013.01); *G06F 3/0608* (2013.01); *G06F 3/0652* (2013.01); *G06F 3/0679* (2013.01); *G06F 12/0882* (2013.01); *G06F 2212/7201* (2013.01); *G06F 2212/7205* (2013.01)

(58) Field of Classification Search
CPC ...... G06F 3/0608; G06F 3/0646; G06F 3/065; G06F 3/0653; G06F 3/0655; G06F 3/0679; G06F 12/0223; G06F 12/0246; G06F 12/0882; G06F 2212/72; G06F 2212/7201;

(Continued)

(56) References Cited

U.S. PATENT DOCUMENTS

2011/0099323 A1\* 4/2011 Syu ...................... G06F 12/0246
                                                        711/103
2013/0024609 A1\* 1/2013 Gorobets .............. G06F 3/0611
                                                        711/E12.008

(Continued)

FOREIGN PATENT DOCUMENTS

CN    109976938    7/2019
TW    201508748    3/2015
TW    201835753    10/2018

OTHER PUBLICATIONS

"Office Action of Taiwan Counterpart Application", dated Jan. 8, 2021, p. 1-p. 8.

*Primary Examiner* — Ilwoo Park
(74) *Attorney, Agent, or Firm* — JCIPRNET

(57) ABSTRACT

A data managing method, a memory controlling circuit unit, and a memory storage device are provided. The method includes: receiving a write command for writing a plurality of first data into a rewritable non-volatile memory module; when the plurality of first data are continuous data, writing the plurality of first data respectively into a plurality of first physical erasing units by using a single-page programming mode, and recording first management information corresponding to the plurality of first physical erasing units; and when the plurality of first data are not the continuous data, writing the plurality of first data respectively into a plurality of second physical erasing units by using the single-page programming mode.

12 Claims, 9 Drawing Sheets

(58) Field of Classification Search
CPC ..... G06F 2212/7205; G06F 2212/7207; G06F 2212/7208
USPC ........................................................ 711/154
See application file for complete search history.

(56) References Cited

U.S. PATENT DOCUMENTS

| | | | |
|---|---|---|---|
| 2013/0282955 A1* | 10/2013 | Parker | G06F 12/0246 |
| | | | 711/E12.008 |
| 2015/0347026 A1* | 12/2015 | Thomas | G06F 12/0246 |
| | | | 711/103 |
| 2016/0094339 A1* | 3/2016 | Agarwal | H04L 9/085 |
| | | | 711/164 |
| 2017/0075812 A1* | 3/2017 | Wu | G06F 12/0246 |
| 2017/0365334 A1* | 12/2017 | Yeh | G06F 3/0679 |
| 2020/0142620 A1* | 5/2020 | Yuan | G06F 3/0631 |
| 2020/0242045 A1* | 7/2020 | Ramamurthy | G06F 12/0246 |
| 2020/0401334 A1* | 12/2020 | Saxena | G06F 3/064 |
| 2021/0055864 A1* | 2/2021 | Noh | G06F 3/0613 |

* cited by examiner

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA MANAGING METHOD. MEMORY CONTROLLING CIRCUIT UNIT AND MEMORY STORAGE DEVICE

CROSS-REFERENCE TO RELATED APPLICATION

This application claims the priority benefit of Taiwan application serial no. 108132227, filed on Sep. 6, 2019. The entirety of the above-mentioned patent application is hereby incorporated by reference herein and made a part of this specification.

BACKGROUND

1. Technology Field

The invention relates to a data managing method, a memory controlling circuit unit and a memory storage device.

2. Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high reading/writing speed. A solid state drive is a memory storage device, which utilizes a flash memory as its storage medium.

For these reasons, flash memories have become an import part of the electronic industries. Based on memorable bits of each memory cell, a NAND-type flash memory may be classified into a Single Level Cell (SLC) NAND-type flash memory, a Multi Level Cell (MLC) NAND-type flash memory and a Trinary Level Cell (TLC) NAND-type flash memory. Here, each memory cell of the SLC NAND-type flash memory is capable of storing one bit data (i.e., "1" and "0"), each memory cell of the MLC NAND-type flash memory is capable of storing two bit data, and each memory cell of the TLC NAND-type flash memory is capable of storing three bit data.

In the NAND-type flash memory, physical programming units are constituted by a plurality of memory cells arranged in the same word line. Because each memory cell of the SLC NAND-type flash memory is capable of storing one bit of data, the memory cells arranged on the same word line are corresponding to one physical programming unit in the SLC NAND-type flash memory.

In comparison with the SLC NAND-type flash memory, a floating gate storage layer of each memory cell of the MLC NAND-type flash memory is capable of storing two bit data. Here, each storage state (i.e., "11", "10", "01" and "00") includes a LSB (Least Significant Bit) and a MSB (Most Significant Bit). For example, in one storage states, the value of a first bit counted from the left is the LSB, and the value of a second bit counted from the left is the MSB. Accordingly, the memory cells arranged on the same word line can constitute two physical programming units. Here, the physical programming unit constituted by the LSBs of said memory cells is known as the lower physical programming unit, and the physical programming unit constituted by the MSBs of said memory cells is known as the upper physical programming unit. In particular, a writing speed of the lower physical programming unit is faster than a writing speed of the upper physical programming unit, and data stored in the lower physical programming unit may be lost due to errors occurred when the upper physical programming unit is being programmed.

Similarly, each memory cell in the TLC NAND-type flash memory is capable of storing three bit data, wherein each storage state (i.e., "111", "110", "101", "100", "011", "010", "001" and "000") includes a first bit counted from the left being the LSB, a second bit counted from the left being a CSB (Center Significant Bit) and a third bit counted from the left being the MSB. Accordingly, the memory cells arranged on the same word line can constitute three physical programming units. Here, the physical programming unit constituted by the LSBs of said memory cells is known as the lower physical programming unit, the physical programming unit constituted by the CSBs of said memory cells is known as a middle physical programming unit, and the physical programming unit constituted by the MSBs of said memory cells is known as the upper physical programming unit. In particular, when memory cells arranged on the same word line are being programmed, the stored data may be lost unless only the lower physical programming unit is programmed or the lower physical programming unit, the middle physical programming unit and the upper physical programming unit are all simultaneously programmed.

In general, in order to increase a writing speed of the TLC NAND-type flash memory used by the memory module, a part of physical erasing units therein is grouped to be operated only by using a single-page programming mode (which only operates in the lower physical programming unit) for simulating operations of the SLC NAND-type flash memory. Later, only when a valid data merging operation is to be performed, the memory management circuit selects a plurality of source physical erasing units from the physical erasing units for simulating operations of the SLC NAND-type flash memory, and collects a plurality of data written by using the single-page programming mode from the source physical erasing units. Lastly, these data are written into a physical erasing unit by using a multi-page programming mode so that the data can be stored into the lower physical programming unit, the middle physical programming unit and the upper physical programming unit of that physical erasing unit.

However, it should be noted that, when the valid data merging operation is performed, the data in the source physical erasing unit selected based on a selecting rule for the source physical erasing units (a rule based on a valid data count or an erase count) may not necessarily be continuous. Therefore, after the valid data merging operation is performed, if a plurality of continuous data need to be stored in the same physical erase unit for data access efficiency, it is usually necessary to perform an additional data merging operation to locate the continuous data from the physical erasing units and then combine and store the continuous data into the same physical erasing unit. However, since a large number of data merging operations are required in above-mentioned situation, operational efficiency of the rewritable non-volatile memory will be greatly reduced.

Based on the above, how to avoid a large number of data merging operations and storing the continuous data in the same physical erasing unit when the data merging operation is performed is a goal of those skilled in the art.

SUMMARY

The invention provides a memory management method, a memory controlling circuit unit and a memory storage device, which are capable of avoiding a large number of data merging operations and storing the continuous data in the same physical erasing unit when the data merging operation is performed.

The invention proposes a data managing method for a rewritable non-volatile memory module. The rewritable non-volatile memory module has a plurality of physical erasing units. The data managing method includes: receiving a write command for writing a plurality of first data into the rewritable non-volatile memory module; when the plurality of first data are continuous data, writing the plurality of first data respectively into a plurality of first physical erasing units among the plurality of physical erasing units by using a single-page programming mode, and recording first management information corresponding to the plurality of first physical erasing units; and when the plurality of first data are not the continuous data, writing the plurality of first data respectively into a plurality of second physical erasing units among the plurality of physical erasing units by using the single-page programming mode.

The invention proposes a memory controlling circuit unit configured to control a rewritable non-volatile memory module. The memory controlling circuit unit includes a host interface, a memory interface and a memory management circuit. The host interface is configured to couple to a host system. The memory interface is configured to couple to a rewritable non-volatile memory module. The rewritable non-volatile memory module has a plurality of physical erasing units. The memory management circuit is coupled to the host interface and the memory interface. The memory management circuit is configured to perform the following operations: receiving a write command for writing a plurality of first data into the rewritable non-volatile memory module; when the plurality of first data are continuous data, writing the plurality of first data respectively into a plurality of first physical erasing units among the plurality of physical erasing units by using a single-page programming mode, and recording first management information corresponding to the plurality of first physical erasing units; and when the plurality of first data are not the continuous data, writing the plurality of first data respectively into a plurality of second physical erasing units among the plurality of physical erasing units by using the single-page programming mode.

The invention proposes a memory storage device, which includes a connection interface unit, a rewritable non-volatile memory module and a memory controlling circuit unit. The connection interface unit is configured to couple to a host system. The rewritable non-volatile memory module includes a plurality of physical erasing units. The memory controlling circuit unit is configured to couple to the connection interface unit and the rewritable non-volatile memory module, and configured to perform the following operations: receiving a write command for writing a plurality of first data into the rewritable non-volatile memory module; when the plurality of first data are continuous data, writing the plurality of first data respectively into a plurality of first physical erasing units among the plurality of physical erasing units by using a single-page programming mode, and recording first management information corresponding to the plurality of first physical erasing units; and when the plurality of first data are not the continuous data, writing the plurality of first data respectively into a plurality of second physical erasing units among the plurality of physical erasing units by using the single-page programming mode.

Based on the above, the data managing method, the memory controlling circuit unit and the memory storage device of the invention can ensure that after the valid data merging operation is performed on the rewritable non-volatile memory module, a plurality of data stored in the same physical erasing unit are mutually continuous. As a result, the problem of operational efficiency of the rewritable non-volatile memory reduced due to a large number of data merging operations required in the conventional art may be solved.

To make the aforementioned more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Figure 1:
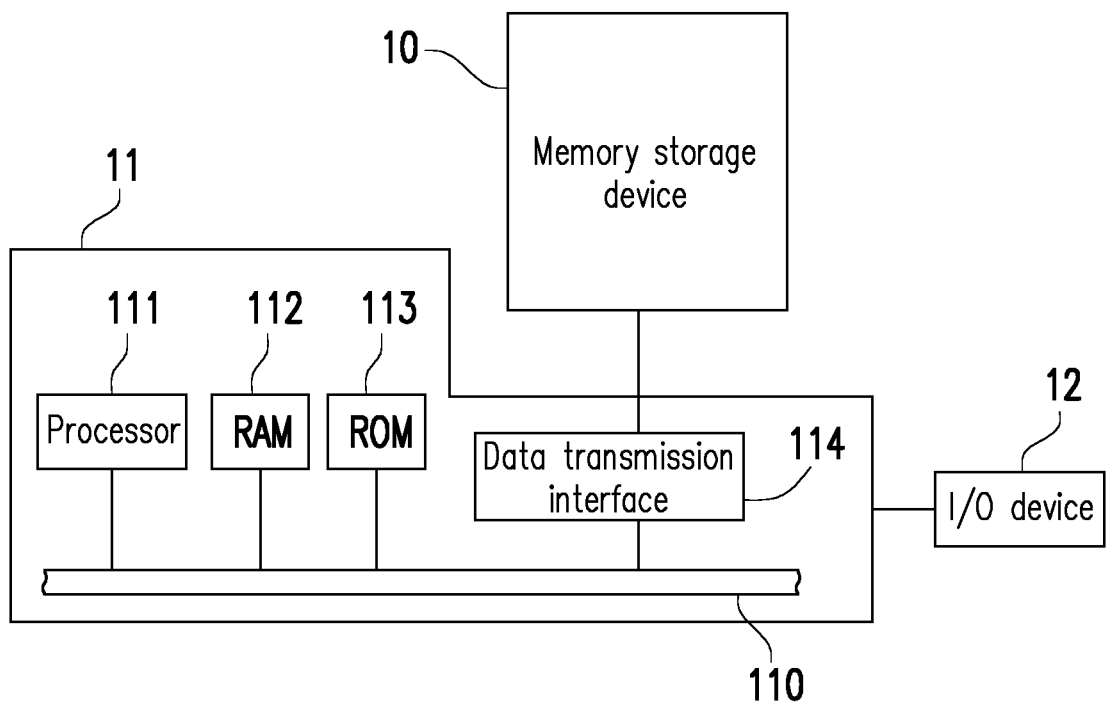
FIG. 1 is a schematic diagram illustrating a host system, a memory storage device and an I/O (input/output) device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
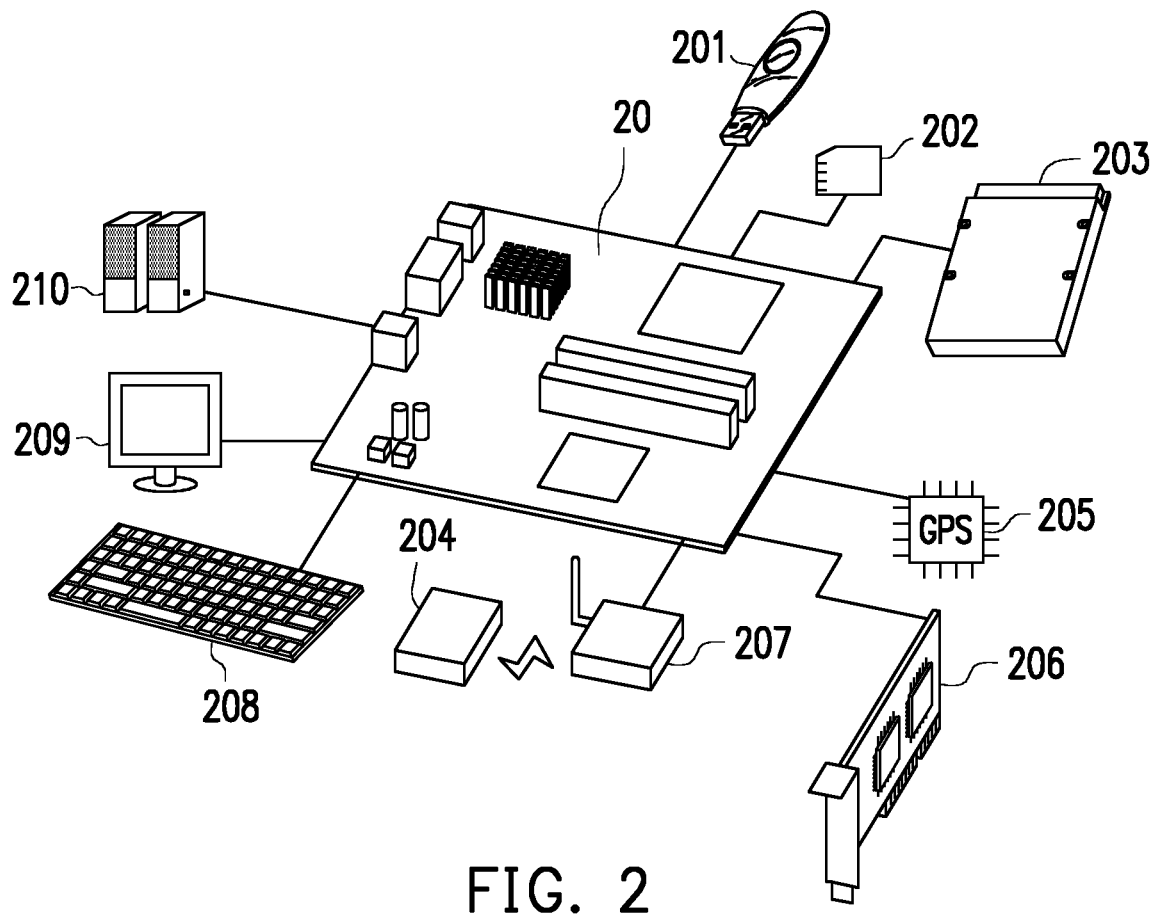
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
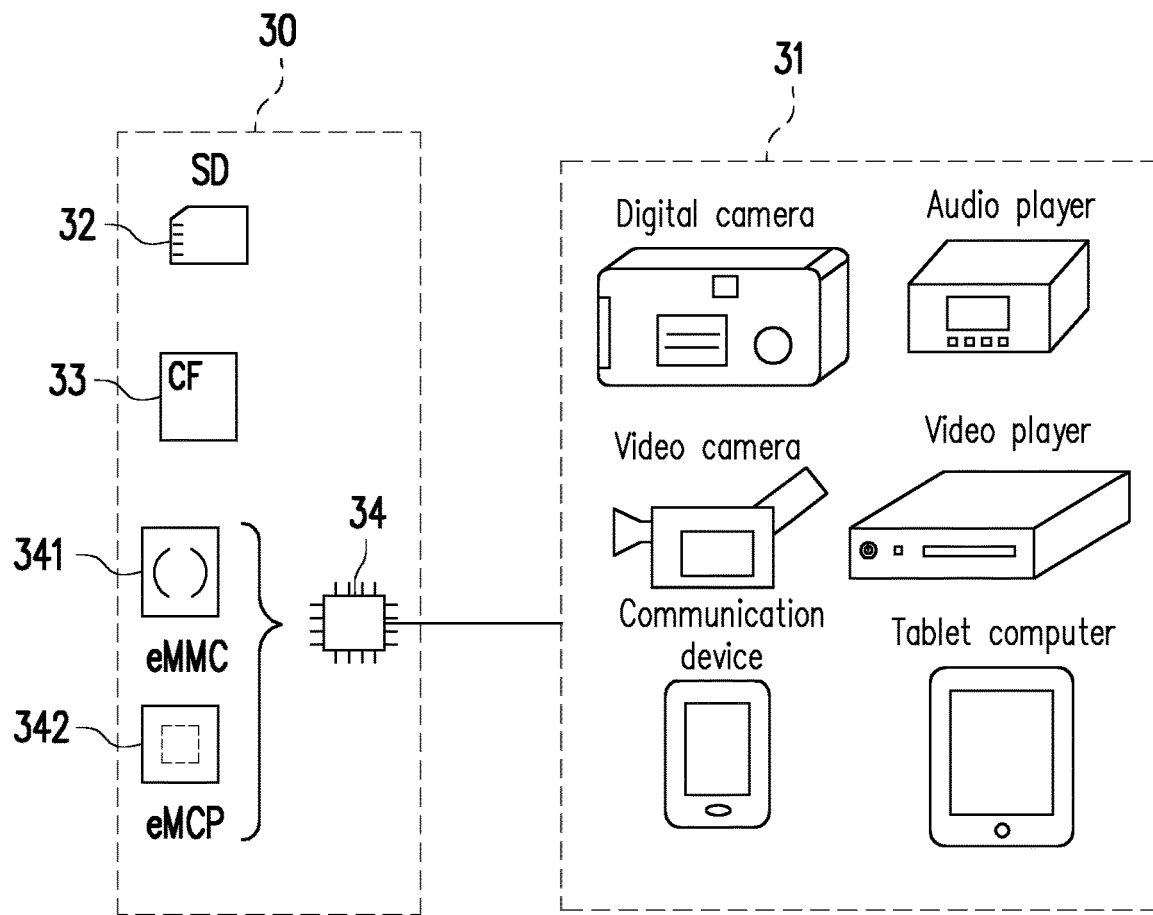
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
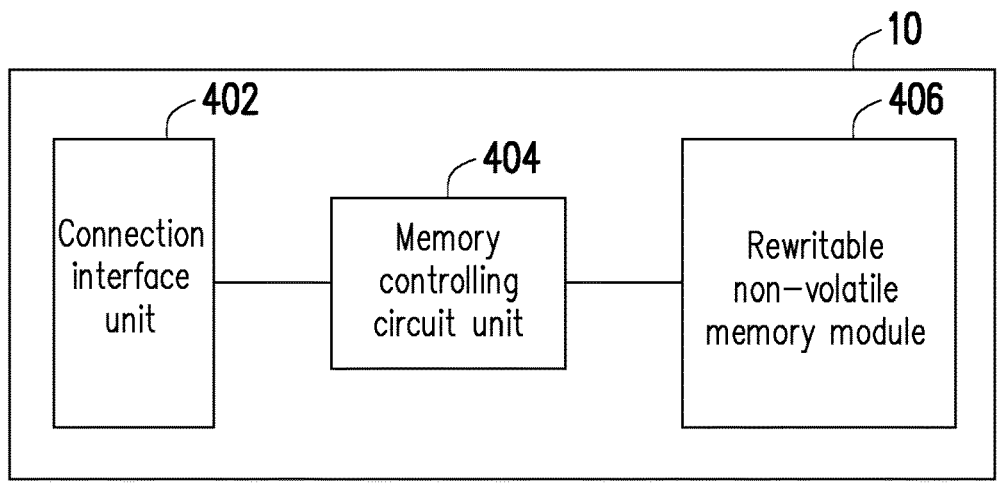
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory controlling circuit unit 404 and a rewritable non-volatile memory module 406.

In this exemplary embodiment, the connection interface unit 402 is compatible with a SATA (Serial Advanced Technology Attachment) standard. Nevertheless, it should be understood that the invention is not limited in this regard. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory controlling circuit unit 404 may be packaged into one chip, or the connection interface unit 402 is distributed outside of a chip containing the memory controlling circuit unit 404.

The memory controlling circuit unit 404 is configured to execute a plurality of logic gates or control commands which are implemented in form of hardware or firmware and perform operations of writing, reading erasing and merging data in the rewritable non-volatile memory storage module 406 according to the commands of the host system 11.

The rewritable non-volatile memory module 406 is coupled to the memory controlling circuit unit 404 and configured to store data written from the host system 11. The rewritable non-volatile memory storage module 406 includes physical erasing units 510(0) to 510(N). For example, the physical erasing units 510(0) to 510(N) may belong to the same memory die or belong to different memory dies. Each of the physical erasing units has a plurality of physical programming units (e.g., in the exemplary embodiments of the invention, each of the physical erasing units includes 258 physical programming units), and the physical programming units of the same physical erasing unit may be written separately and erased simultaneously. Nevertheless, it should be understood that the invention is not limited in this regard. Each physical erasing unit may be composed of 64 physical programming units, 256 physical programming units or any number of the physical programming units.

More specifically, the physical erasing unit is a minimum unit for erasing. That is, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area containing multiple physical access addresses is used for storing user data, and the redundant bit area is used to store system data (e.g., control information and error checking and correcting code). In this exemplary embodiment, each data bit area of the physical programming unit contains 4 physical access addresses, and the size of each physical access address is 512 byte. However, in other exemplary embodiments, the data bit area may also include more or less of the physical access addresses, and an amount and a size of the physical access addresses are not limited in the invention.

In this exemplary embodiment of the invention, the rewritable non-volatile memory module 406 is a Trinary Level Cell (TLC) NAND-type flash memory module (i.e., a flash memory module capable of storing three bit data in one memory cell). However, the invention is not limited in this regard. The rewritable non-volatile memory module 406 may also be a Multi Level Cell (MLC) NAND-type flash memory module (i.e., a flash memory module capable of storing two bit data in one memory cell), other flash memory modules or other memory module having the same features.

Figures 5A, 5B:
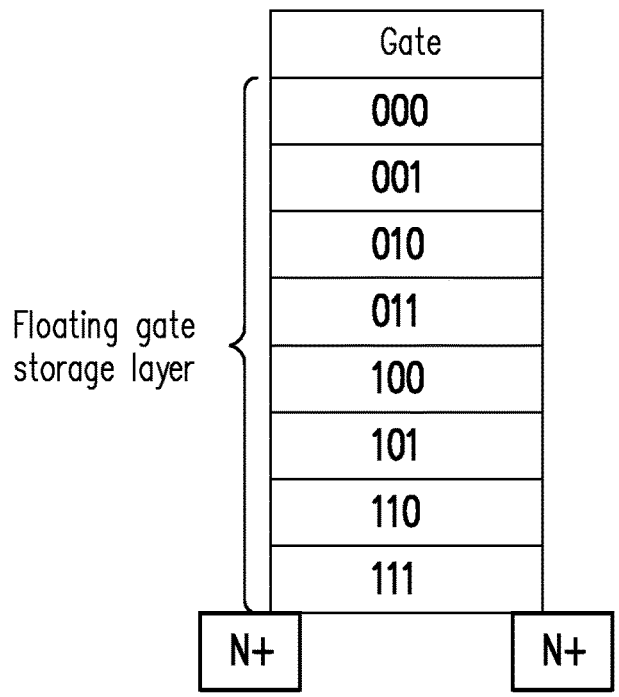
FIG. 5A and FIG. 5B are schematic diagrams illustrating a memory cell storage structure and a physical erasing unit according to an exemplary embodiment.

FIG. 5A and FIG. 5B are schematic diagrams illustrating a memory cell storage structure and a physical erasing unit according to an exemplary embodiment.

Referring to FIG. 5A, each storage state of each memory cell in the rewritable non-volatile memory module 406 can be identified as "111", "110", "101", "100", "011", "010", "001" or "000" (as shown in FIG. 5A). The first bit counted from the left side of the storage state is the LSB, the second bit counted from the left side of the storage state is the CSB and the third bit counted from the left side of the storage state is the MSB. In addition, the memory cells arranged on the same word line can constitute three physical programming units. Here, the physical programming unit constituted by the LSBs of said memory cells is known as the lower physical programming unit, the physical programming unit constituted by the CSBs of said memory cells is known as a middle physical programming unit, and the physical programming unit constituted by the MSBs of said memory cells is known as the upper physical programming unit.

Referring to FIG. 5B, one physical erasing unit is constituted by a plurality of physical programming unit groups. Each of the physical programming unit groups includes the lower physical programming unit, the middle physical programming unit and the upper physical programming unit constituted by multiple memory cells arranged on the same word line. For example, in the physical erasing unit, the 0th physical programming unit belonging to the lower physical programming unit, the 1st physical programming unit belonging to the middle physical programming unit and the 2nd physical programming unit belonging to the upper physical programming unit are regarded as one physical programming unit group. Similarly, the 3rd, 4th, and 5th physical programming units are regarded as one physical programming unit group, and by analogy, the other physical programming units are also grouped into multiple physical programming unit groups by the same method.

Figure 6A:
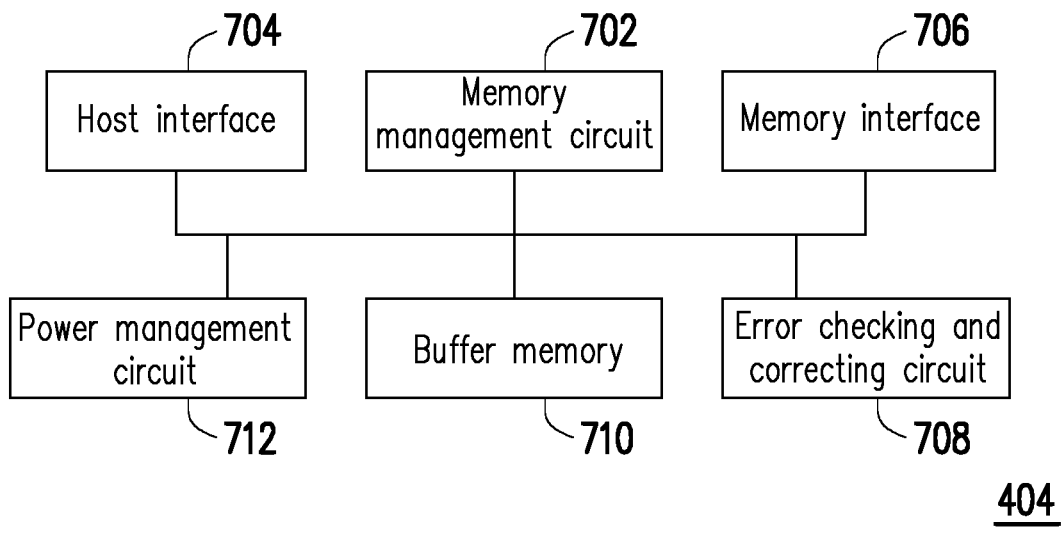
FIG. 6A is a schematic block diagram illustrating a memory controlling circuit unit according to an exemplary embodiment of the invention.

FIG. 6A is a schematic block diagram illustrating a memory controlling circuit unit according to an exemplary embodiment of the invention.

Referring to FIG. 6A, the memory controlling circuit unit 404 includes a memory management circuit 702, a host interface 704, a memory interface 706 and an error checking and correcting circuit 708.

The memory management circuit 702 is configured to control overall operation of the memory controlling circuit unit 404. Specifically, the memory management circuit 702 has a plurality of control commands. When the memory storage device 10 operates, the control commands are executed to perform various operations such as data writing, data reading and data erasing. Hereinafter, description regarding operations of the memory management circuit 702 or any circuit element in the memory controlling circuit unit 404 is equivalent to description regarding operations of the memory controlling circuit unit 404.

In this exemplary embodiment, the control commands of the memory management circuit 702 are implemented in form of firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, a system area in a memory exclusively used for storing system data) of the rewritable non-volatile memory module 406. In addition, the memory management circuit 702 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 702 when the memory controlling circuit unit 404 is enabled. Then, the control commands are executed by the microprocessor unit to perform operations, such as writing, reading or erasing data.

Further, in another exemplary embodiment, the control commands of the memory management circuit 702 may also be implemented in form of hardware. For example, the memory management circuit 702 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instruct the rewritable non-volatile memory module 406 to execute the corresponding operations, such as writing, reading and erasing. In an exemplary embodiment, the memory management circuit 702 may further issue command sequences of other types to instruct the rewritable non-volatile memory module 406 to execute the corresponding operations.

The host interface 704 is coupled to the memory management circuit 702 and configured to receive and identify commands and data sent from the host system 11. In other words, the commands and data transmitted by the host system 11 are transmitted to the memory management circuit 702 via the host interface 704. In this exemplary embodiment, the host interface 704 is compatible with the SATA standard. Nevertheless, it should be understood that the invention is not limited in this regard. The host interface 704 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 706 is coupled to the memory management circuit 702 and configured to access the rewritable non-volatile memory module 406. In other words, data to be written into the rewritable non-volatile memory module 406 is converted into a format acceptable by the rewritable non-volatile memory module 406 via the memory interface 706. Specifically, if the memory management circuit 702 intends to access the rewritable non-volatile memory module 406, the memory interface 706 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 702 and transmitted to the rewritable non-volatile memory module 406 via the memory interface 706, for example. The command sequences may include one or more signals, or data transmitted in the bus. The signals or the data may include command codes and program codes. For example, information such as identification codes and memory addresses are included in the read command sequence.

The error checking and correcting circuit 708 is coupled to the memory management circuit 702 and configured to perform an error checking and correcting operation to ensure integrity of data. Specifically, when the memory management circuit 702 receives the writing command from the host system 11, the error checking and correcting circuit 708 generates an error correcting code (ECC) or an error detecting code (EDC) for data corresponding to the writing command, and the memory management circuit 702 writes data and the ECC or the EDC corresponding to the writing command to the rewritable non-volatile memory module 406. Then, when the memory management circuit 702 reads the data from the rewritable non-volatile memory module 406, the corresponding ECC and/or the EDC are also read, and the error checking and correcting circuit 708 performs the error checking and correcting operation on the read data based on the ECC and/or the EDC.

In an exemplary embodiment, the memory controlling circuit unit 404 further includes a buffer memory 710 and a power management circuit 712.

The buffer memory 710 is coupled to the memory management circuit 702 and configured to temporarily store data and commands from the host system 11 or data from the rewritable non-volatile memory module 406. The power management unit 712 is coupled to the memory management circuit 702 and configured to control a power of the memory storage device 10.

In this exemplary embodiment, the error checking and correcting circuit 708 can perform a single-frame encoding for the data stored in the same physical programming unit and can also perform a multi-frame encoding for data stored in multiple physical programming units. Each of the single-frame encoding and the multi-frame encoding may adopt encoding algorithms including at least one of a LDPC (low density parity code), a BCH code, a convolutional code or a turbo code. Alternatively, in another exemplary embodiment, the multi-frame encoding may also include a RS codes (Reed-solomon codes) algorithm or an XOR (exclusive OR) algorithm. Further, in another exemplary embodiment, more of other encoding algorithms not listed above may also be adopted, which are omitted herein. According to the adopted encoding algorithm, the error check and correction circuit 708 can encode the data to be protected, so as to generate the corresponding ECC and/or the EDC. For clear description, the ECC and/or the EDC generated by encoding are collectively referred to as encoded data.

Figure 6B:
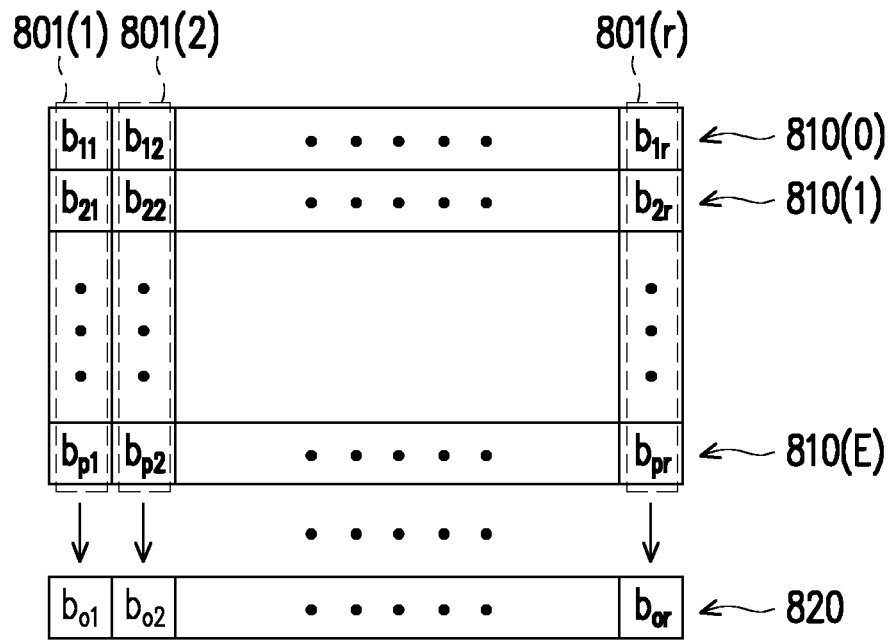
FIG. 6B is a schematic diagram illustrating a multi-frame encoding according to an exemplary embodiment of the invention.

FIG. 6B is a schematic diagram illustrating a multi-frame encoding according to an exemplary embodiment of the invention.

Referring to FIG. 6B and taking encoded data 820 correspondingly generated by encoding the data stored in physical programming units 810(0) to 810(E) as an example, at least a part of data stored by each of the physical programming units 810(0) to 810(E) may be regarded as one frame. In the multi-frame encoding, the data in the physical programming units 810(0) to 810(E) are encoded based on each of positions where bits (or bytes) are located. For example, bits $b_{11}$, $b_{21}$, ..., $b_{p1}$ at a position 801(1) are encoded as a bit $b_{o1}$ in the encoded data 820 and bits $b_{12}$, $b_{22}$, ..., $b_{p2}$ at a position 801(2) are encoded as a bit $b_{o2}$ in the encoded data 820; and by analogy, bits $b_{1r}$, $b_{2r}$, ..., $b_{pr}$ at a position 801(r) are encoded as a bit $b_{or}$ in the encoded data 820. Later, the data read from the physical programming units 810(0) to 810(E) may be decoded according to the encoded data 820 so attempts on correcting possible errors in the read data can be made.

In addition, in another exemplary embodiment of FIG. 6B, the data used for generating the encoded data 820 may also include redundancy bits corresponding to the data bits in the data stored in the physical programming units 810(0) to 810(E). Taking the data stored in the physical programming unit 810(0) as an example, the redundancy bits therein are, for example, generated by performing the single-frame encoding for the data bits stored in the physical programming unit 810(0). In this exemplary embodiment, it is assumed that when the data of the physical programming unit 810(0) is read, the data read from the physical programming unit 810(0) may be decoded by the redundancy bits (e.g., the encoded data of the single-frame encoding) in the physical programming unit 810(0) so as to perform the error check and correct operation. However, when a decoding operation performed by using the redundancy bits in the physical programming unit 810(0) fails (e.g., a number of error bits of the data stored in the physical programming unit 810(0) is greater than a threshold), a retry-read mechanism may be used to attempt reading correct data from the physical programming unit 810(0). Details regarding the retry-read mechanism would be described later. When the correct data cannot be read from the physical programming unit 810(0) by using the retry-read mechanism, the encoded data 820 and data of the physical programming units 810(1) to 810(E) may be read and the decoding may be performed according to the encoded data 820 and the data of the physical programming units 810(1) to 810(E) so as to attempt correcting errors included in the data stored in the physical programming unit 810(0). In other words, in this exemplary embodiment, when the decoding operation performed by using the encoded data generated by the single-frame encoding fails and the reading operation performed by using the retry-read mechanism fails, the encoded data generated by the multi-frame encoding will be used for the decoding operation instead.

Figure 7:
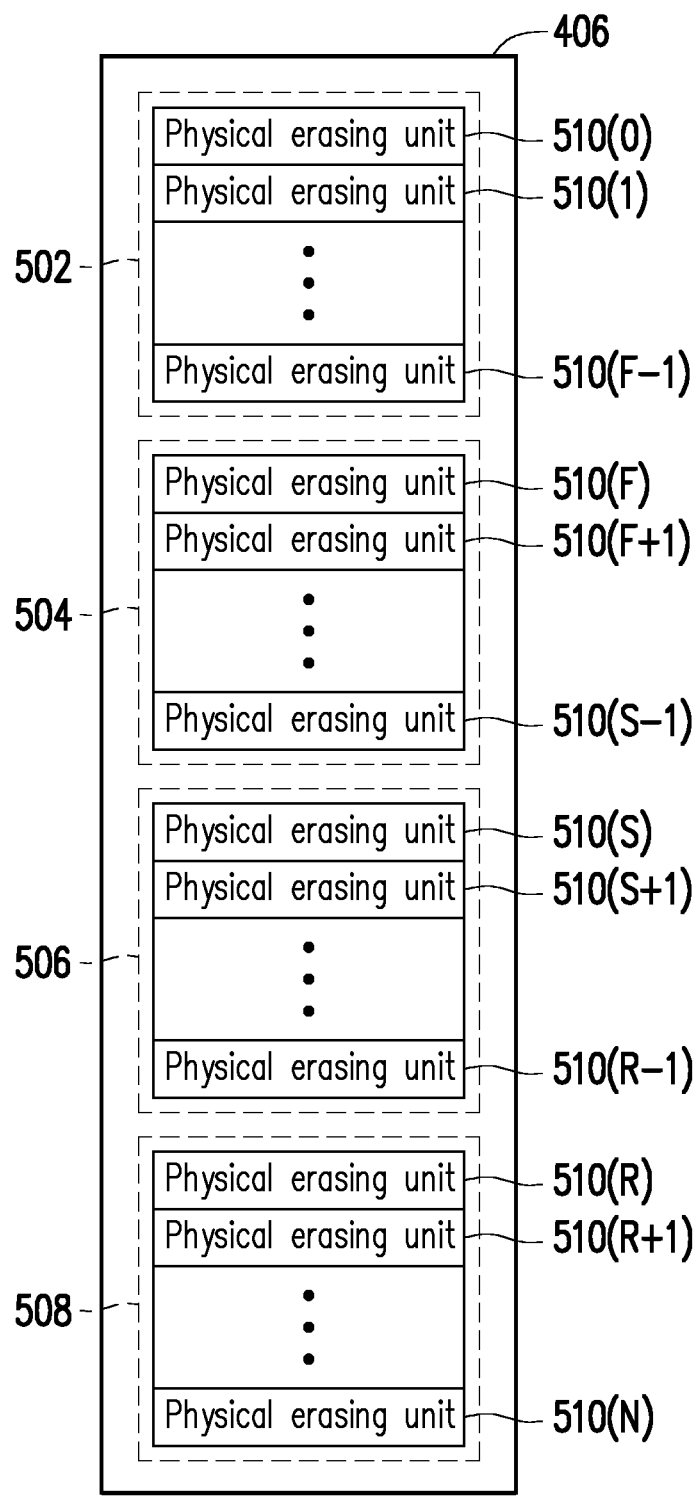
FIG. 7 and FIG. 8 are schematic diagrams illustrating a management of the physical erasing units according to an exemplary embodiment.
Figure 8:
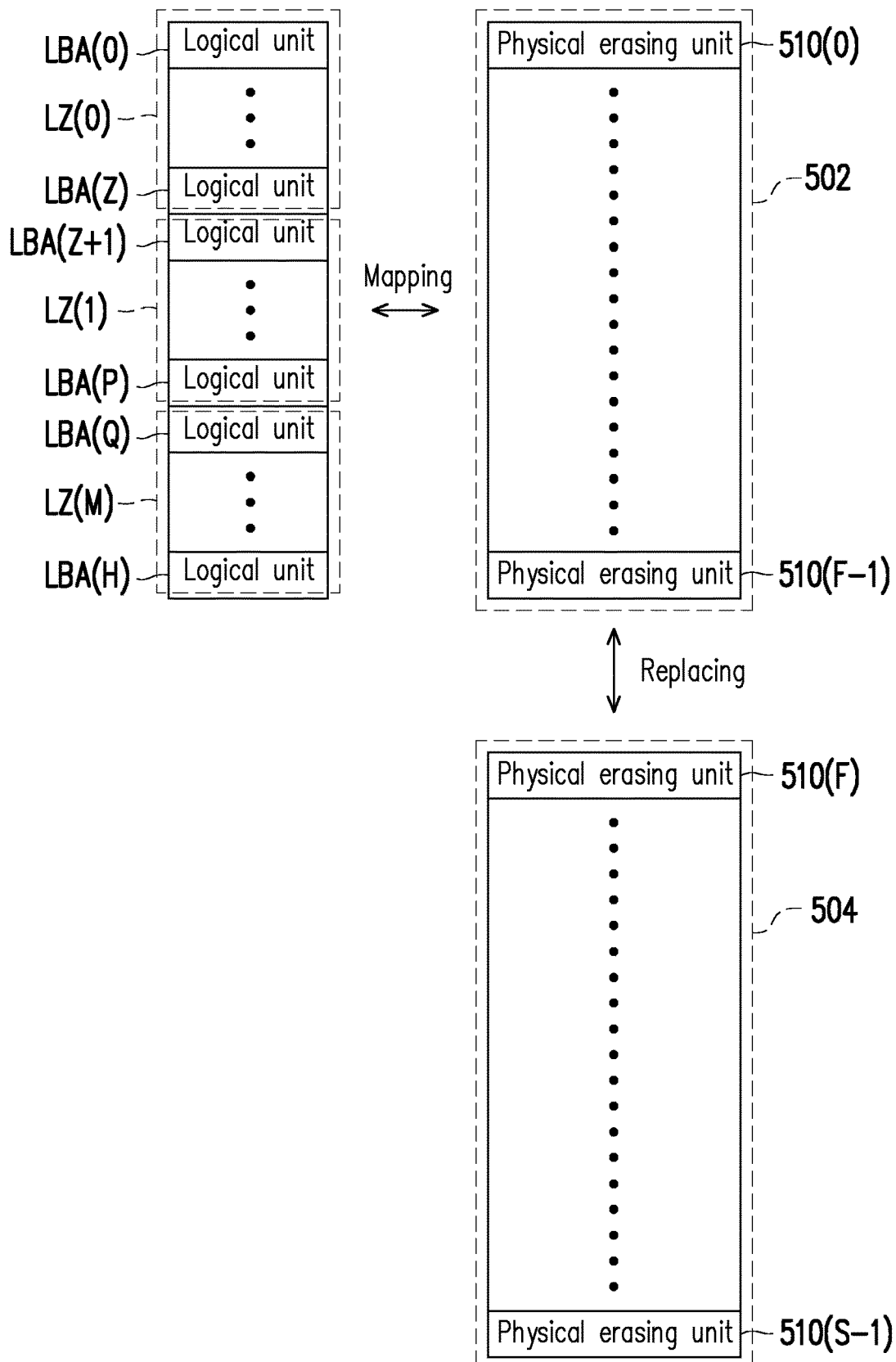

FIG. 7 and FIG. 8 are schematic diagrams illustrating a management of the physical erasing units according to an exemplary embodiment.

Referring to FIG. 7, the rewritable non-volatile memory module 406 has a plurality of physical erasing units 510(1) to 510(N), which are logically partitioned into a data area 502, a spare area 504, a temporary area 506 and a replacement area 508 by the memory management circuit 702.

The physical erasing units logically belonging to the data area 502 and the spare area 504 are configured to store data from the host system 11. More specifically, the physical erasing units of the data area 502 are regarded as the physical erasing units stored with the data, whereas the physical erasing units of the spare area 504 are configured to replace the physical erasing units of the data area 502. In other words, when the write command and the data to be written are received from the host system 11, the memory management circuit 702 selects the physical erasing units from the spare area 504, and writes the data into the selected physical erasing units for replacing the physical erasing units in the data area 502.

The physical erasing units logically belonging to the temporary area 506 are configured to record system data. For example, the system data includes a logical-to-physical address mapping table, information related to manufacturer and model of the rewritable non-volatile memory module, a number of physical erasing units in the rewritable non-volatile memory module, a number of the physical programming units in each physical erasing unit, and the like.

The physical erasing units logically belonging to the replacement area 508 are used in a bad physical erasing unit replacement procedure for replacing damaged physical erasing units. More specifically, if the replacement area 508 still includes normal physical erasing units when the physical erasing units in the data area 502 are damaged, the memory management circuit 302 retrieves the normal physical erasing units from the replacement area 508 for replacing the damaged physical erasing units.

In particular, the numbers of the physical erasing units in the data area 502, the spare area 504, the temporary area 506 and the replacement area 508 may be different from one another based on the different memory specifications. In addition, it should be understood that, during operation of the memory storage device 10, grouping relations of the physical erasing units for associating with the data area 502, the spare area 504, the temporary area 506, and the replacement area 508 may be dynamically changed. For example, when the damaged physical erasing units in the spare area 504 are replaced by the physical erasing units in the replacement area 508, the physical erasing units originally from the replacement area 508 are then associated with the spare area 504.

Referring to FIG. 8, the memory management circuit 702 configures logical units LBA(0) to LBA(H) for mapping to the physical erasing units in the data area 502, wherein each of the logical units includes a plurality of logical sub-units for mapping to the physical programming units of the corresponding physical erasing units. Further, when the host system 11 intends to write the data into the logical units or update the data stored in the logical units, the memory management circuit 702 can retrieve one physical erasing unit from the spare area 504 as replacement to the physical erasing units in the data area 502 for writing the data. In this exemplary embodiment, the logical sub-units may be logical pages or logical sectors.

In order to identify which of the physical erasing units is the data of each logical unit being stored to, the memory management circuit 702 can record a mapping between the logical unit and the physical erasing unit in this exemplary embodiment. Further, when the host system 11 intends to access the data in the logical sub-unit, the memory management circuit 702 can confirm the logical unit to which the logical sub-unit belongs and access the data in the physical erasing unit mapped to the logical unit. For instance, in this exemplary embodiment, the memory management circuit 702 stores logical-to-physical address mapping tables into the rewritable non-volatile memory module 406 for recording the physical erasing units mapped to the logical units, and the logical-to-physical address mapping tables are loaded into the buffer memory 710 for maintenance when the memory management circuit 702 intends to the access the data.

It should be noted that, the mapping table is unable to record the mapping relationship for all of the logical units because a capacity of the buffer memory 710 is limited. Therefore, in this exemplary embodiment, the memory management unit 702 can group the logical units LBA(0) to LBA(H) into a plurality of logical zones LZ(0) to LZ(M) and configure one logical-to-physical address mapping table for each of the logical zones. In particular, when the memory management unit 702 intends to update the mapping relationship for one specific logical unit, the logical address-to-physical address mapping table corresponding to the logical zone to which the logical unit belongs may be loaded into the buffer memory 710 for updating.

It should be noted that, the memory management circuit 702 can write the rewritable non-volatile memory module 406 by using a single-page programming mode or a multi-page programming mode.

In particular, in this embodiment, when the memory management circuit 702 receives a plurality of write commands for writing a plurality of data (a.k.a. first data) into the rewritable non-volatile memory module 406 from the host system 11, the memory management circuit 702 first determines whether the first data are continuous data. For example, when a plurality of logical addresses of the first data are continuous, the memory management circuit 702 determines that the first data are the continuous data. When the logical addresses of the first data are not continuous, the memory management circuit 702 determines that the first data are not the continuous data.

When the first data are the continuous data, the memory management circuit 702 writes the first data respectively into a plurality of physical erasing units (a.k.a. first physical erasing units) by using the single-page programming mode, and records management information (a.k.a. first management information) corresponding to these first physical erasing units. In an embodiment, the first management information may be used to record an order of the first data. In another embodiment, in the operation of recording the first management information, the memory management circuit 702 also marks the first data by using a first flag (e.g., a bit value "1") for indicating that these first physical erasing units store the continuous first data. However, the invention is not limited in this regard. In other embodiments, the memory management circuit 702 may also record a binding relationship of the first physical erasing units into a lookup table.

When the first data are not the continuous data, the memory management circuit 702 writes the first data respectively into a plurality of physical erasing units (a.k.a. second physical erasing units) by using the single-page programming mode. In an embodiment, the memory management circuit 702 may not record management information corresponding to the second physical erasing units. Alternatively, in other embodiments, the memory management circuit 702 may also mark the second physical erasing units by using a second flag (e.g., a bit value "0") for indicating that these second physical erasing units store the non-continuous data.

The detailed process of writing the continuous data into the rewritable non-volatile memory module 406 is described below with reference to an example.

Figure 9:
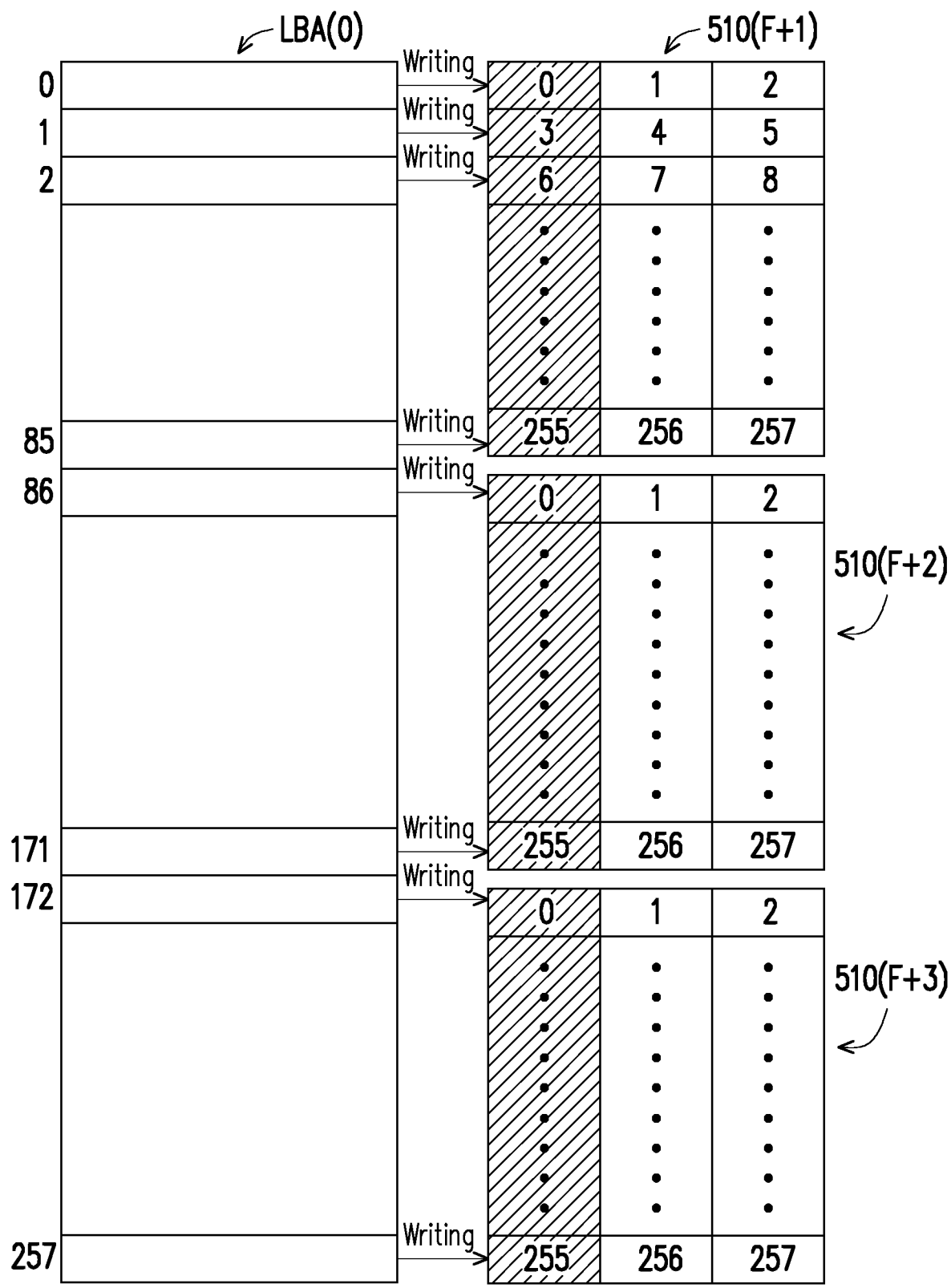
FIG. 9 is a schematic diagram illustrating how the data are written into the rewritable non-volatile memory module by using a single-page programming mode according to an example.

FIG. 9 is a schematic diagram illustrating how the data are written into the rewritable non-volatile memory module by using a single-page programming mode according to an example.

Referring to FIG. 9, when the memory storage device 10 receives a plurality of write commands (a.k.a. first write commands) from the host system 11 as an instruction for writing update data into 0th to 257th logical sub-units of the logic unit LBA(0), the memory storage device 702 determines whether logical addresses of the update data of the first write commands are continuous. It is assumed that in this exemplary embodiment, the memory management circuit 702 retrieves three physical erasing units 510(F+1), 510(F+2) and 510(F+3) (i.e., the first physical erasing units described above) from the spare area 504 as a plurality of active physical erasing units corresponding to the first write commands. If the memory management circuit 702 writes the data by using the single-page programming mode, the memory management circuit 702 writes the data of the first write commands from the buffer memory 710 into the physical programming units of the physical erasing units 510(F+1), 510(F+2) and 510(F+3) according to a first command sequence. Here, because the physical programming units of the physical erasing units 510(F+1), 510(F+2) and 510(F+3) are programmed by using the single-page programming mode, as described above, the memory cells for constituting the physical programming units of the physical erasing units 510(F+1), 510(F+2) and 510(F+3) are programmed to store one bit data. In other words, in the single-page programming mode, the lower physical programming units of the physical erasing units 510(F+1), 510(F+2) and 510(F+3) are used for writing data, and the middle physical programming units and the upper physical programming units of the physical erasing units 510(F+1), 510(F+2) and 510(F+3) are not used for writing data.

In details, as shown by FIG. 9, the memory management circuit 702 writes data to be stored into the 0th to 257th logical sub-units of the logical unit LBA(0) sequentially into the lower physical programming units of the physical erasing units 510(F+1), 510(F+2) and 510(F+3). In other words, the memory management circuit 702 writes the data corresponding to the first write commands from the buffer memory 710 into the lower physical programming units of the physical erasing units 510(F+1), 510(F+2) and 510(F+3) in the rewritable non-volatile memory module 406 by using the single-page programming mode, and the middle physical programming units and the upper physical programming units of the physical erasing units 510(F+1), 510(F+2) and 510(F+3) are not used for writing data.

After the data corresponding to the first write commands are written from the buffer memory 710 into the lower physical programming units of the physical erasing units 510(F+1), 510(F+2) and 510(F+3) in the rewritable non-volatile memory module 406 by using the single-page programming mode, the memory management circuit 702 associates the physical erasing units 510(F+1), 510(F+2) and 510(F+3) with the data area 502, and replies a writing-completed message to the host system 11 in response to the first write commands issued by the host system 11.

In particular, in this embodiment, since the data written into the physical erasing units 510(F+1), 510(F+2) and 510(F+3) are the continuous data, the memory management circuit 702 further records management information (a.k.a. the first management information) corresponding to the physical erasing units 510(F+1), 510(F+2) and 510(F+3). In an embodiment, the first management information may be used to record an order of the data stored by the physical erasing units 510(F+1), 510(F+2) and 510(F+3). In another embodiment, the memory management circuit 702 further marks the physical erasing units 510(F+1), 510(F+2) and 510(F+3) by using the first flag for indicating that these physical erasing units store the continuous data. However, the invention is not limited in this regard. In other embodiments, the memory management circuit 702 may also record a binding relationship of the physical erasing units 510(F+1), 510(F+2) and 510(F+3) into a lookup table.

Figure 10:
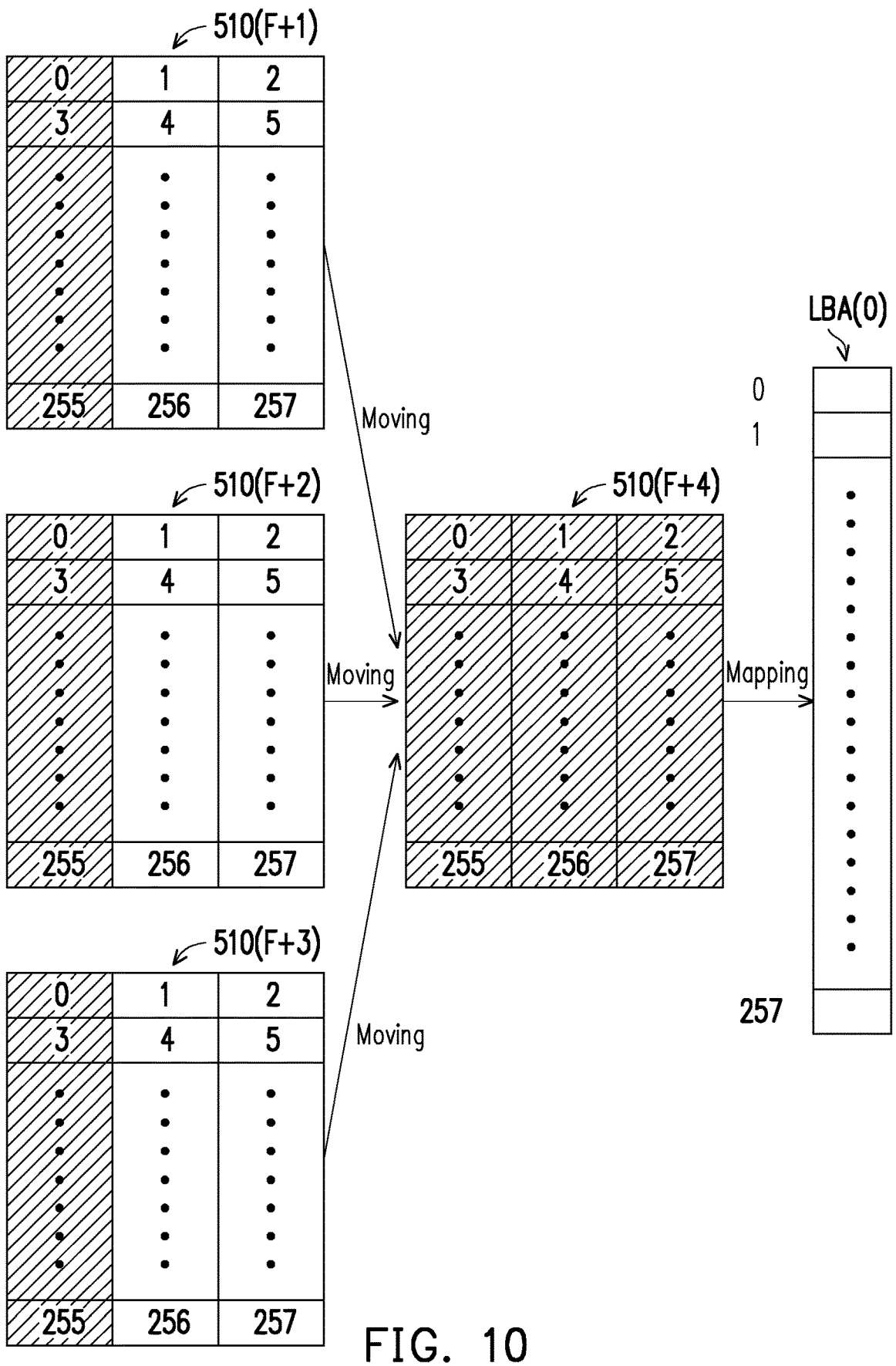
FIG. 10 is a schematic diagram illustrating a valid data merging operation performed on the data written by the single-page programming mode by using a multi-page programming mode according to an example.

FIG. 10 is a schematic diagram illustrating a valid data merging operation performed on the data written by the single-page programming mode by using a multi-page programming mode according to an example.

It is assumed that the physical erasing unit 510(F+1), the physical erasing unit 510(F+2) and the physical erasing unit 510(F+3) corresponding to the logic unit LBA(0) are already storing valid data of all the logical sub units of the logical unit LBA(0) (as shown by FIG. 9), and the memory storage device 10 is in a background execution mode. For example, when the memory storage device 10 is in an idle state for a period of time (for example, no commands (e.g., the write command, the read command, a clearance command, a trim command, or the like) are received from the host system 11 for 30 seconds)), or when the number of empty physical erasing units in the spare area 504 is less than a preset threshold, the memory storage device 702 then performs the valid data merging operation.

In details, when the memory storage device 10 is idle for 30 seconds without receiving commands from the host system 11, or when the number of empty physical erasing units in the spare area 504 is less than the preset threshold, the memory storage device 702 performs the valid data merging operation. Referring to FIG. 10, when the memory storage device 702 performs the valid data merging operation, the memory management circuit 702 retrieves, for example, one physical erasing unit from the spare area 604 to be used as a physical erasing unit 510(F+4) (hereinafter referred to as a third physical erasing unit) for replacement. Specifically, the memory management circuit 702 selects one empty physical erasing unit or one specific physical erasing unit stored with invalid data from the spare area 604. In particular, if the retrieved physical erasing unit is the specific physical erasing unit stored with the invalid data, the memory management circuit 702 first performs an erasing operation on the specific physical erasing unit. In other words, the invalid data of the physical erasing unit needs to be erased first.

Afterwards, the memory management circuit 702 identifies the physical erasing units used for storing the continuous data (e.g., the physical erasing units 510(F+1), 510(F+2) and 510(F+3)) according to the "first management information" previously recorded when the writing operation is performed. Taking the physical erasing units 510(F+1), 510(F+2) and 510(F+3) storing the continuous data as an example, the memory management circuit 702 copies the valid data in the physical erasing units 510(F+1), 510(F+2) and 510(F+3) to the physical programming units in the physical erasing unit 510(F+4) in the rewritable non-volatile memory module 406 by using the multi-page programming mode. Here, because the physical erasing unit 510(F+4) is programmed by using the multi-page programming mode, as described above, the memory cells for constituting the physical programming units of the physical erasing unit 510(F+4) are programmed to store multiple bit data. In other words, in the multi-page programming mode, the lower physical programming units, the middle physical programming units and the upper physical programming units of the physical erasing unit 510(F+4) are used for writing data.

In detail, the memory management circuit 702 writes (or copies) the valid data belonging to the 0th to 85th logical sub-units of the logical unit LBA(0) from the lower physical programming units of the physical erasing unit 510(F+1) into corresponding pages (e.g., 0th to 85th physical programming units) of the physical erasing unit 510(F+4). Then, the memory management circuit 702 copies the valid data belonging to the 86th to 171st logical sub-units of the logical unit LBA(0) from the lower physical programming units of the physical erasing unit 510(F+2) to corresponding pages (e.g., 86th to 171st physical programming units) of the physical erasing unit 510(F+4). Lastly, the memory management circuit 702 copies the valid data belonging to the 172nd to 257th logical sub-units of the logical unit LBA(0) from the lower physical programming units of the physical erasing unit 510(F+3) to corresponding pages (e.g., 172nd to 257th physical programming units) of the physical erasing unit 510(F+4). In other words, in the multi-page programming mode, 0th to 257th physical programming units of the physical erasing unit 510(F+4) are all used for writing data.

That is to say, when the valid data merging operation is performed, because the physical erasing units to be associated with the data area 602 are operated by using the multi-page programming mode, the data are all simultaneously or progressively written (programmed) into the physical erasing unit 510(F+4) by using the physical programming unit group as a unit. Specifically, in an exemplary embodiment, the 0th, 1st and 2nd physical programming units of the physical erasing unit 510(F+4) are simultaneously programmed for writing the data belonging to the 0th, 1st and 2nd logical sub-units of the logical unit LBA(0); the 3rd, 4th and 5th physical programming units of the physical erasing unit 510(F+4) are simultaneously programmed for writing the data belonging to the 3rd, 4th and 5th logical sub-units of the logical unit LBA(0); and by analogy, the data of the other logical sub units are all written into the physical erasing unit 510(F+4) by using the physical programming unit group as the unit.

Lastly, the memory management circuit 702 maps the logical unit LBA(0) to the physical erasing unit 510(F+4) in a logical-physical mapping, performs the erasing operation on the physical erasing units 510(F+1) to 510(F+3) and re-associates the physical erasing units 510(F+1) to 510(F+3) to the spare area 604. In other words, when a subsequent write command is to be executed, the erased physical erasing units 510(F+1) to 510(F+3) may be selected again as the active physical erasing units for the logical unit to be written.

Figure 11:
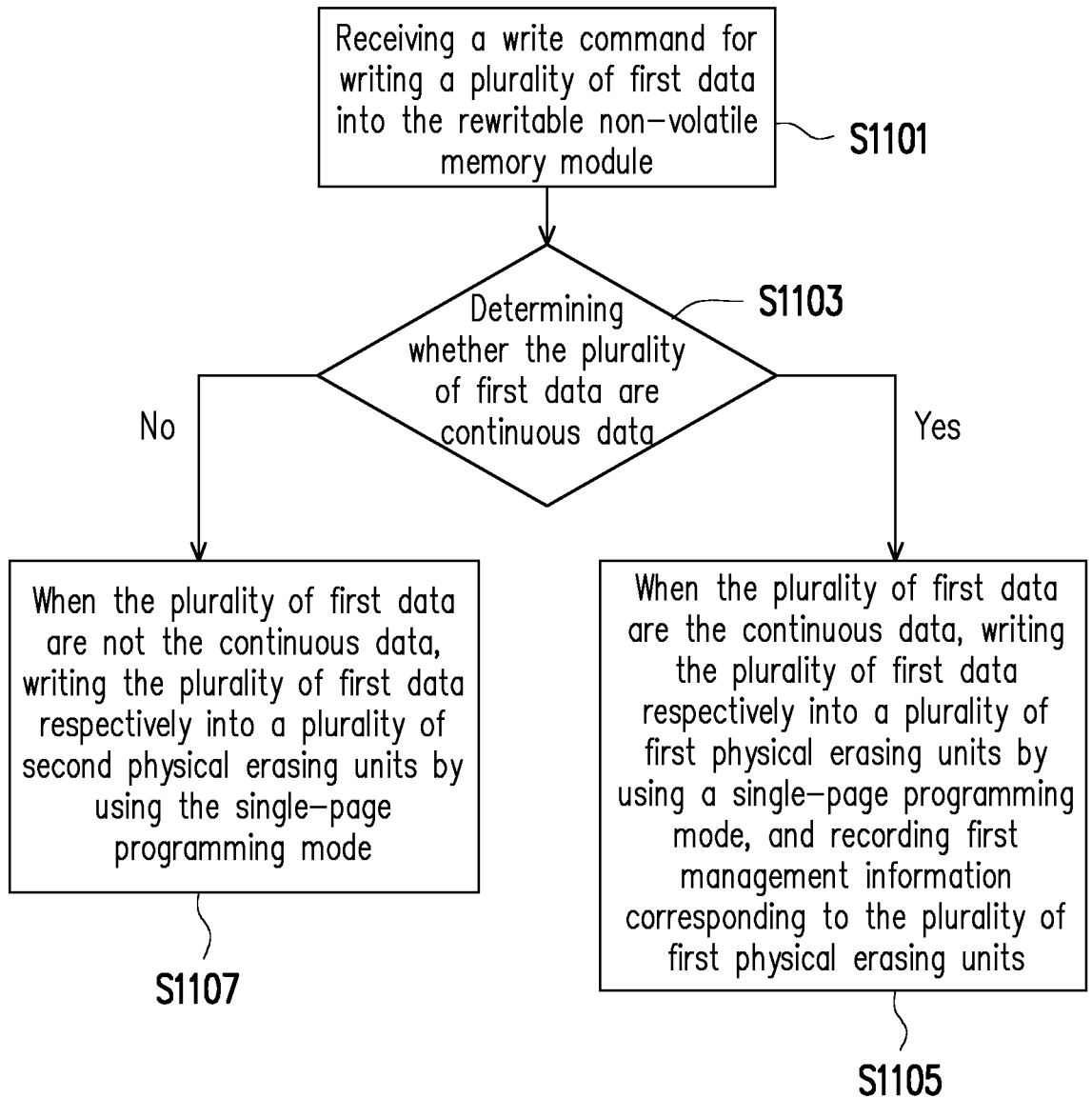
FIG. 11 is a flowchart of a data managing method according to an example.

FIG. 11 is a flowchart of a data managing method according to an example.

Referring to FIG. 11, in step S1101, the memory management circuit 702 receives a write command for writing a plurality of first data into the rewritable non-volatile memory module 406. In step S1103, the memory management circuit 702 determines whether the plurality of first data are continuous data. When the plurality of first data are continuous data, in step S1105, the memory management circuit 702 writes the plurality of first data respectively into a plurality of first physical erasing units by using a single-page programming mode, and recording first management information corresponding to the plurality of first physical erasing units. When the plurality of first data are not the continuous data, in step S1107, the memory management circuit 702 writes the plurality of first data respectively into a plurality of second physical erasing units by using the single-page programming mode.

In summary, the data managing method, the memory controlling circuit unit and the memory storage device of the invention can ensure that after the valid data merging operation is performed on the rewritable non-volatile memory module, a plurality of data stored in the same physical erasing unit are mutually continuous. As a result, the problem of operational efficiency of the rewritable non-volatile memory reduced due to a large number of data merging operations required in the conventional art may be solved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A data managing method for a rewritable non-volatile memory module, wherein the rewritable non-volatile memory module has a plurality of physical erasing units, and the memory managing method comprises:

receiving a write command for writing a plurality of first data into the rewritable non-volatile memory module;

only when the plurality of first data are continuous data, writing the plurality of first data respectively into a plurality of first physical erasing units among the plurality of physical erasing units by using a single-page programming mode, and recording first management information to identify the plurality of first physical erasing units for storing the plurality of first data, wherein a plurality of logical addresses of the plurality of first data are continuous and the step of recording first management information to identify the plurality of first physical erasing units for storing the plurality of first data comprises:
recording an order of the plurality of first data;
when a valid data merging operation is performed, identifying the plurality of first physical erasing units respectively storing the plurality of first data from the plurality of physical erasing units according to the first management information;
copying the plurality of first data from the plurality of first physical erasing units, and writing the plurality of first data into a third physical erasing unit among the plurality of physical erasing units by using a multi-page programming mode; and
when the plurality of first data are not the continuous data, writing the plurality of first data respectively into a plurality of second physical erasing units among the plurality of physical erasing units by using the single-page programming mode.

2. The data managing method according to claim 1, further comprising:
determining whether the plurality of logical addresses of the plurality of first data are continuous;
when the plurality of logical addresses of the plurality of first data are continuous, determining that the plurality of first data are the continuous data; and
when the plurality of logical addresses of the plurality of first data are not continuous, determining that the plurality of first data are not the continuous data.

3. The data managing method according to claim 1, wherein the step of recording the first management information corresponding to the plurality of first physical erasing units comprises:
marking the plurality of first physical erasing units by using a first flag.

4. The data managing method according to claim 1, wherein the step of recording the first management information corresponding to the plurality of first physical erasing units comprises:
recording a binding relationship of the plurality of first physical erasing units into a lookup table.

5. A memory controlling circuit unit for controlling a rewritable non-volatile memory module, the memory controlling circuit unit comprising:
a host interface, configured to couple to a host system,
a memory interface, configured to couple to the rewritable non-volatile memory module, wherein the rewritable non-volatile memory module has a plurality of physical erasing units;
a memory management circuit, coupled to the host interface and the memory interface,
wherein the memory management circuit is configured to receive a write command for writing a plurality of first data into the rewritable non-volatile memory module;
only when the plurality of first data are continuous data, the memory management circuit is further configured to write the plurality of first data respectively into a plurality of first physical erasing units among the plurality of physical erasing units by using a single-page programming mode, and record first management information to identify the plurality of first physical erasing units for storing the plurality of first data,
wherein a plurality of logical addresses of the plurality of first data are continuous and in the operation of recording the first management information corresponding to the plurality of first physical erasing units, the memory management circuit is further configured to record an order of the plurality of first data,
when a valid data merging operation is performed, the memory management circuit is further configured to identify the plurality of first physical erasing units respectively storing the plurality of first data from the plurality of physical erasing units according to the first management information,
the memory management circuit is further configured to copy the plurality of first data from the plurality of first physical erasing units, and write the plurality of first data into a third physical erasing unit among the plurality of physical erasing units by using a multi-page programming mode, and
when the plurality of first data are not the continuous data, the memory management circuit is further configured to write the plurality of first data respectively into a plurality of second physical erasing units among the plurality of physical erasing units by using the single-page programming mode.

6. The memory controlling circuit unit according to claim 5, wherein
the memory management circuit is further configured to determine whether the plurality of logical addresses of the plurality of first data are continuous,
when the plurality of logical addresses of the plurality of first data are continuous, the memory management circuit is further configured to determine that the plurality of first data are the continuous data, and
when the plurality of logical addresses of the plurality of first data are not continuous, the memory management circuit is further configured to determine that the plurality of first data are not the continuous data.

7. The memory controlling circuit unit according to claim 5, wherein in the operation of recording the first management information corresponding to the plurality of first physical erasing units,
the memory management circuit is further configured to mark the plurality of first physical erasing units by using a first flag.

8. The memory controlling circuit unit according to claim 5, wherein in the operation of recording the first management information corresponding to the plurality of first physical erasing units,
the memory management circuit is further configured to record a binding relationship of the plurality of first physical erasing units into a lookup table.

9. A memory storage device, comprising:
a connection interface unit, configured to couple to a host system;
a rewritable non-volatile memory module, wherein the rewritable non-volatile memory module has a plurality of physical erasing units; and
a memory controlling circuit unit, coupled to the connection interface unit and the rewritable non-volatile memory module,
wherein the memory controlling circuit unit is configured to receive a write command for writing a plurality of first data into the rewritable non-volatile memory module;
only when the plurality of first data are continuous data, the memory controlling circuit unit is further configured to write the plurality of first data respectively into a plurality of first physical erasing units among the plurality of physical erasing units by using a single-page programming mode, and record first management information to identify the plurality of first physical erasing units for storing the plurality of first data, wherein a plurality of logical addresses of the plurality of first data are continuous and in the operation of recording the first management information corresponding to the plurality of first physical erasing units, the memory controlling circuit unit is further configured to record an order of the plurality of first data, when a valid data merging operation is performed, the memory controlling circuit unit is further configured to identify the plurality of first physical erasing units respectively storing the plurality of first data from the plurality of physical erasing units according to the first management information, the memory controlling circuit unit is further configured to copy the plurality of first data from the plurality of first physical erasing units, and write the plurality of first data into a third physical erasing unit among the plurality of physical erasing units by using a multi-page programming mode, and when the plurality of first data are not the continuous data, the memory controlling circuit unit is further configured to write the plurality of first data respectively into a plurality of second physical erasing units among the plurality of physical erasing units by using the single-page programming mode.

10. The memory storage device according to claim 9, wherein the memory controlling circuit unit is further configured to determine whether the plurality of logical addresses of the plurality of first data are continuous, when the plurality of logical addresses of the plurality of first data are continuous, the memory controlling circuit unit is further configured to determine that the plurality of first data are the continuous data, and when the plurality of logical addresses of the plurality of first data are not continuous, the memory controlling circuit unit is further configured to determine that the plurality of first data are not the continuous data.

11. The memory storage device according to claim 9, wherein in the operation of recording the first management information corresponding to the plurality of first physical erasing units, the memory controlling circuit unit is further configured to mark the plurality of first physical erasing units by using a first flag.

12. The memory storage device according to claim 9, wherein in the operation of recording the first management information corresponding to the plurality of first physical erasing units, the memory controlling circuit unit is further configured to record a binding relationship of the plurality of first physical erasing units into a lookup table.

* * * * *